US010564701B2

(12) United States Patent
Thomas et al.

(10) Patent No.: US 10,564,701 B2
(45) Date of Patent: Feb. 18, 2020

(54) SYSTEM AND METHOD FOR OPERATING A MICROCOMPUTER IN SLEEP-MODE AND AWAKE MODE WITH LOW POWER EVENT PROCESSING

(71) Applicant: SweetSense, Inc., Portland, OR (US)

(72) Inventors: Evan Thomas, Portland, OR (US); Michael Fleming, Vancouver, WA (US); William Kelly Spiller, Vancouver, WA (US)

(73) Assignee: SweetSense, Inc., Denver, CO (US)

( * ) Notice: Subject to any disclaimer, the term of this patent is extended or adjusted under 35 U.S.C. 154(b) by 163 days.

(21) Appl. No.: 15/542,645

(22) PCT Filed: Dec. 15, 2015

(86) PCT No.: PCT/US2015/065898
§ 371 (c)(1),
(2) Date: Jul. 10, 2017

(87) PCT Pub. No.: WO2016/111816
PCT Pub. Date: Jul. 14, 2016

(65) Prior Publication Data
US 2018/0136711 A1    May 17, 2018

Related U.S. Application Data

(60) Provisional application No. 62/101,048, filed on Jan. 8, 2015.

(51) Int. Cl.
*G06F 1/00* (2006.01)
*G06F 1/3287* (2019.01)
*G06F 1/3234* (2019.01)

(52) U.S. Cl.
CPC .......... *G06F 1/3287* (2013.01); *G06F 1/3243* (2013.01); *Y02D 10/171* (2018.01)

(58) Field of Classification Search
CPC .... G06F 1/3287; G06F 1/3243; Y02D 10/171
See application file for complete search history.

(56) References Cited

U.S. PATENT DOCUMENTS

| 5,177,371 A | * | 1/1993 | Faulk | G01R 19/16542 |
| | | | | 307/150 |
| 2003/0187775 A1 | * | 10/2003 | Du | G06F 9/441 |
| | | | | 705/37 |
| 2006/0100002 A1 | * | 5/2006 | Luebke | G06F 3/0362 |
| | | | | 455/574 |
| 2008/0114916 A1 | * | 5/2008 | Hummel | G06F 12/1081 |
| | | | | 710/266 |

(Continued)

*Primary Examiner* — Xuxing Chen
(74) *Attorney, Agent, or Firm* — Rylander & Associates, PC; Philip R. M. Hunt

(57) ABSTRACT

Microcomputer with a sleep mode system uses a non-volatile memory stack for saving system variables, then switches the microcomputer completely off to go into sleep-mode. In sleep-mode, the microcomputer sleep mode system uses a low powered clock and sensors to trigger time events and device events that power up the microcomputer when needed. When in awake-mode, the microcomputer logs any data from connected device(s). The microcomputer turns on an internet radio and transmits data logged, updates its clock time and receives any configuration updates before powering back down into sleep-mode.

1 Claim, 2 Drawing Sheets

(56) References Cited

U.S. PATENT DOCUMENTS

| | | | |
|---|---|---|---|
| 2010/0138187 A1* | 6/2010 | Dzung | H04J 3/0682 |
| | | | 702/176 |
| 2014/0216129 A1* | 8/2014 | Schmidlin | G01N 33/0062 |
| | | | 73/23.2 |
| 2015/0156445 A1* | 6/2015 | Lee | H04N 5/63 |
| | | | 348/569 |
| 2016/0091955 A1* | 3/2016 | Black | G01D 9/005 |
| | | | 702/189 |

* cited by examiner

SYSTEM AND METHOD FOR OPERATING A MICROCOMPUTER IN SLEEP-MODE AND AWAKE MODE WITH LOW POWER EVENT PROCESSING

This application claims the benefit of U.S. Provisional Application No. 62/101,048, filed 1 Jan. 2014, incorporated herein by reference.

FIELD OF THE INVENTION

The present invention relates to microcomputer systems and operations. More particularly, the present invention relates to systems and methods for transitioning a microcomputer into and out of a sleep-mode.

BACKGROUND

Current methods for transitioning a microcomputer into and out of a sleep-mode rely heavily on the microcomputer's internal circuitry to internally switch resources on and off as needed to eliminate power dissipation and prolong battery life. Firmware that manages microcomputer sleeping is frequently the most demanding and problematic part of system coding. Interrupt management and reliably placing the microcomputer into sleep and reliably bringing the microcomputer out of sleep can be difficult, especially as these microcomputers become more and more advanced. Sleep power dissipation is low, but completely turning the microcomputer's power off makes it much lower.

Smaller and lower performance microcomputers can effectively reduce power dissipation to acceptable levels for many applications that require long battery life, but as remote battery operated systems become the eyes and ears of the internee's cloud computers, these remote battery operated systems most often require microcomputers with the most advanced state of the art performance. Typically, these microcomputers are very fast and have large internal volatile and non-volatile memories along with a vast array of internal peripherals. As these microcomputers perform faster and faster and their internal resources grow they demand more power, even in sleeping modes.

What is needed is a way to put a microcomputer in a sleep-mode by completely powering it off.

SUMMARY

To save power and also eliminate firmware difficulties, the system and method described herein uses a non-volatile memory stack for saving system variables, switches the microcomputer completely off, and uses small, low power time events and event triggered devices to power up the microcomputer when needed.

The microcomputer (uC) initially powers up and communicates with any attached event devices to see which if any caused the power up. If an event device is determined to have caused the power up, then that device's information is logged into the system's non-volatile memory. The microcomputer checks to see if an Internet connection is available. If an Internet connection is available, the microcomputer retrieves an updated configuration file stored on the Internet. At the end of processing the device saves system state variables to non-volatile memory and powers down.

BRIEF DESCRIPTION OF THE DRAWINGS

The present invention will be described by way of exemplary embodiments, but not limitations, illustrated in the accompanying drawings in which like references denote similar elements, and in which.

The accompanying drawings, which are incorporated into and constitute a part of this specification, illustrate one or more embodiments of the invention and, together with the detailed description, serve to explain the principles and implementations of the invention.

DETAILED DESCRIPTION

Before beginning a detailed description of the subject invention, mention of the following is in order. When appropriate, like reference materials and characters are used to designate identical, corresponding, or similar components in different figures. The figures associated with this disclosure typically are not drawn with dimensional accuracy to scale, i.e., such drawings have been drafted with a focus on clarity of viewing and understanding rather than dimensional accuracy.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application and business related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Use of directional terms such as "upper," "lower," "above," "below", "in front of" "behind," etc. are intended to describe the positions and/or orientations of various components of the invention relative to one another as shown in the various Figures and are not intended to impose limitations on any position and/or orientation of any embodiment of the invention relative to any reference point external to the reference.

Those skilled in the art will recognize that numerous modifications and changes may be made to the exemplary embodiment(s) without departing from the scope of the claimed invention. It will, of course, be understood that modifications of the invention, in its various aspects, will be apparent to those skilled in the art, some being apparent only after study, others being matters of routine mechanical, chemical and electronic design. No single feature, function or property of the exemplary embodiment(s) is essential. Other embodiments are possible, their specific designs depending upon the particular application. As such, the scope of the invention should not be limited by the particular embodiments herein described but should be defined only by the appended claims and equivalents thereof.

Exemplary Embodiment—System Overview

Figure 1:
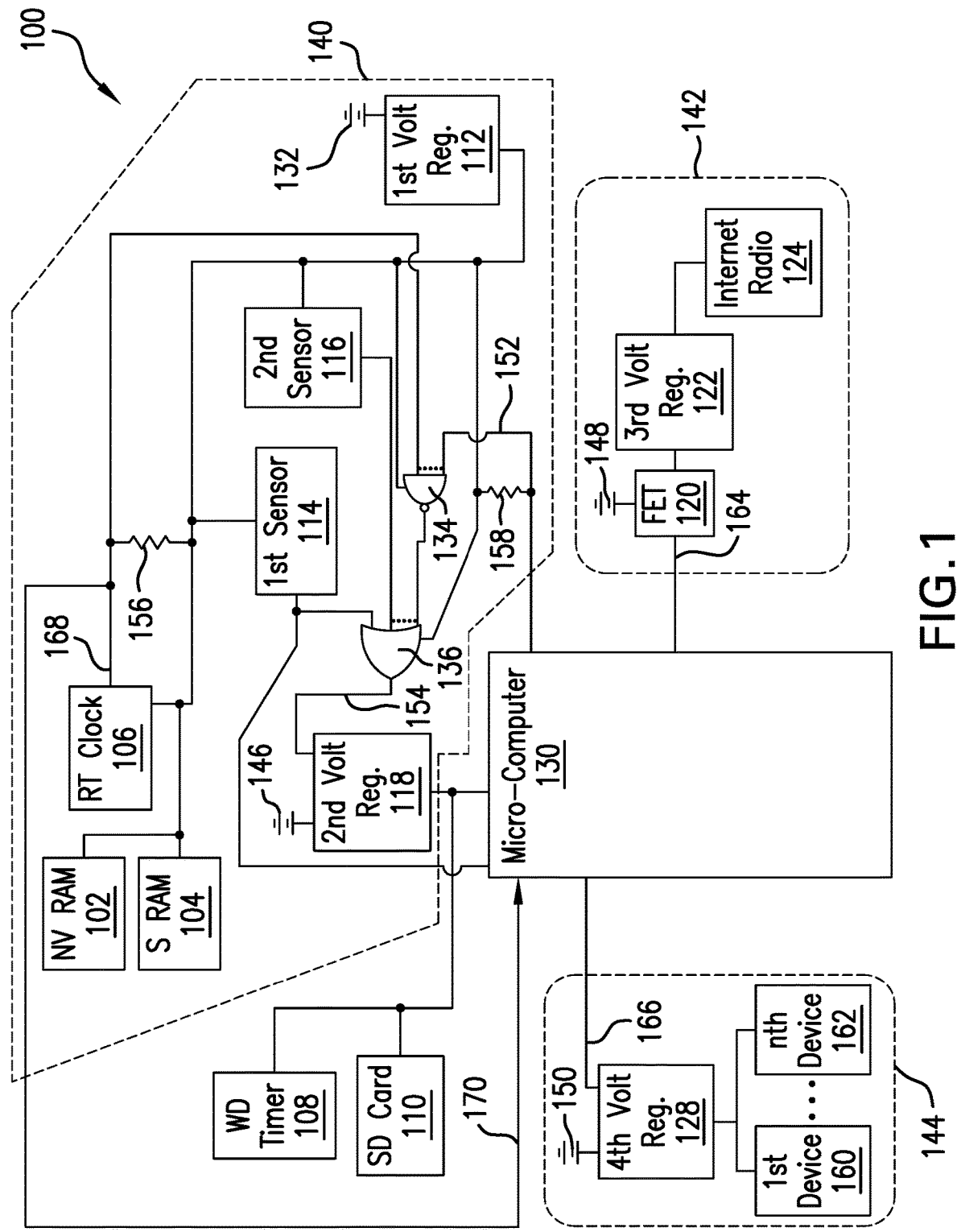
FIG. 1 shows a schematic view of an exemplary embodiment of a microcomputer sleep-mode system.

FIG. 1 shows a schematic view of an exemplary embodiment of a microcomputer sleep-mode system 100. The microcomputer sleep-mode system 100 may be used to control a remote device. This remote device may be one of many remote devices in a communication network with the remote devices connected to each other and/or to a central control system. The microcomputer sleep-mode system 100 comprises a microcomputer 130, sleep-mode circuitry 140, internet radio circuitry 142, and event device circuitry 144. The sleep-mode circuitry 140 is configured for putting the microcomputer 130 into sleep-mode and also for bringing the microcomputer 130 back into an awake-mode. The internet radio circuitry 142 is configured for operating an internet radio 124 in the awake-mode to communicate with the central station or other remote devices. The event device circuitry 144 is configured for operating devices that are only active when the microcomputer 130 is in the awake-mode.

The microcomputer 130 in the exemplary embodiment comprises a microcontroller such as the TI LM3S5C51, which comprises a processor, memory, clock, I/O interfaces and other components on a single integrated circuit. In other embodiments, the microcomputer 130 may be microprocessor on one integrated circuit combined with additional integrated circuits for memory and other components. A typical microcontroller will have on-chip flash memory to store and execute its programs, so it will have a quicker start up time than a microprocessor based microcomputer that uses off-chip memory. The microcomputer 130 includes a WD (watchdog) timer 108 and an SD (secure digital) card reader 110 in the exemplary embodiment, with the WD timer 108 typically in the microcontroller integrated circuit. The WD timer 108 is configured to reboot the processor of the microcomputer 130 if something goes wrong, such as a power glitch that can cause the processor to lock-up. The SD card reader 110 is configured to read an SD card so that a user can load new configurations into the microcomputer 130 when an internet connection is not available.

Sleep-Mode Circuitry—Structure

The sleep-mode circuitry 140 has a first voltage regulator 112 that provides electrical power to most of the other components of the sleep-mode circuitry 140 at a constant voltage from a first power supply 132. In a typical remote device, the first power supply 132 is an electro-chemical battery. The sleep-mode circuitry 140 has a second voltage regulator 118 that provides electrical power to microcomputer 130 at a constant voltage from a second power supply 146, which may be the same power source as the first power supply 132. In the exemplary embodiment, the first voltage regulator 112 is an ultra-low power regulator with extremely low quiescent current, such as the mic5231. The mic5231 typically has a 0.65 uA quiescent current at an input voltage ($V_{in}$) of 6 v and a maximum output current of 10 mA. The first voltage regulator 112 supplies electrical power to most of the other components of the sleep-mode circuitry 140, including an RT clock 106 (real time clock), a first sensor 114, a second sensor 116, and logical components including a NAND gate 134 and an OR gate 136. These components of the sleep-mode circuitry 140 are all chosen to have low power consumption, since they will be on for long periods of time while the microcomputer 130 is in sleep-mode.

The first sensor 114 has an output line and is configured to set its output high when it detects some environmental condition is present and set its output low when it detects the environmental condition is not present. The first sensor 114 may be any type of sensor, including an accelerometer, a temperature sensor, a pressure sensor, a gas concentration sensor or a proximity sensor. The sensors of the sleep-mode circuitry 140 are low-powered devices and typically do not have any other output than their high/low output line. The output line of the first sensor 114 leads to a first input of the OR gate 136. Similarly, the second sensor 116 has an output line and is configured to set its output high when it detects some environmental condition is present and set its output low when it detects the environmentL condition is not present. Like the first sensor 114, second sensor 116 may be any type of sensor, but will typically be a different type than the first sensor 114. The output line of the second sensor 116 leads to a second input of the OR gate 136. The sleep-mode circuitry 140 may have additional sensors beyond the first sensor 114 and second sensor 116. The output lines of any additional sensors lead to additional inputs of the OR gate 136.

The RT clock 106 is configured for keeping track of the current time and can be set to keep a standard time, such as the official time of a local time zone. The RT clock 106 has an RT clock output line 168. The RT clock 106 is configured to keep this RT clock output line 168 high when the output condition of the RT clock 106 is inactive and low when its output condition is active. The output condition becomes active when the RT clock 106 reaches a particular turn-on time. The turn-on time may be one of a series of turn-on times separated by time intervals that may be regular or irregular. After setting its output condition active, the RT clock 106 keeps the RT clock output line 168 low for at least a turn-on time interval that is long enough for the microcomputer 130 to power up and set a keep-awake line 152 to low (active). The RT clock 106 returns its output condition to inactive after the turn-on time interval is over or when a turn-off time is reached. The RT clock output line 168 leads to a first input of the NAND gate 134. The keep-awake line 152 from the microcomputer 130 leads to a second input of the NAND gate 134.

The RT clock output line 168 also branches to a microcontroller heartbeat line 170 connected to an interrupt input on the microcomputer 130. When the microcomputer 130 is powered up in the awake-mode, the RT clock output line 168 can function to generate a "heartbeat" signal that increments the tasks that the microcomputer 130 is programmed to do.

The second voltage regulator 118 has an enable line 154 connected to the output of the OR gate 136. The second voltage regulator 118 is configured to switch to an off state when its enable line 154 is low and switch to an on state when its enable line 154 is high. In the off state, the second voltage regulator 118 does not pass through any voltage or power to its output. In the exemplary embodiment, the second voltage regulator 118 is a low dropout voltage regulator, with very low quiescent current in the off state, such as the Microchip MCP1804, but in other embodiments, may be some other voltage regulator. The quiescent current of the MCP1804 is 0.01 µA in the off state and 50 µA typical in the on state.

The sleep-mode circuitry 140 also has two memory blocks—an NV RAM (non-volatile random access memory) 102 and an S RAM (Synchronous Random Access Memory) 104. Both the NV RAM 102 and the S RAM 104 are supplied with power by the first voltage regulator 112. The NV RAM 102 stores system configurations and system parameters that the microcomputer 130 loads when it powers up and writes back to the NV RAM 102 when it powers down. The S RAM 104 serves as typical off-chip bulk memory for typical operations of the microcomputer 130 in the awake-mode.

Sleep-Mode Circuitry—Operation

The sleep-mode circuitry 140 is configured to turn on the microcomputer 130 when either the RT clock 106 output is active (low) or one of the sensors (e.g. 114, 116) outputs is active (high). When the microcomputer 130 is powered down in sleep-mode and the RT clock output line 168 is inactive (high), the keep-awake line 152 from the microcomputer 130 and the RT clock output line 168 are held high by pull-up resistors 156, 158. This keeps the NAND gate 134 output low. As long as all the sensor (e.g. 114, 116) outputs remain inactive (low), then the output of the OR gate 136 is low, the second voltage regulator 118 is not enabled and the microcomputer 130 remains without power. Once the RT clock output line 168 is active (low), the NAND gate 134 output will go high, the OR gate 136 output will go high, and the second voltage regulator 118 will become enabled and pass power to the microcomputer 130.

When the microcomputer 130 is powered down in sleep-mode and one of the sensor (114, 116) outputs goes active (high), the OR gate 136 output then goes high, and the second voltage regulator 118 will become enabled and pass power to the microcomputer 130.

Once the microcomputer 130 is turned on, it will set active (low) the keep-awake line 152. Once the keep-awake line 152 is set active (low), regardless of the state of the outputs of the sensors (e.g. 114, 116) and the RT clock output line 168, the NAND gate 134 output and the OR gate 136 output will remain high, the second voltage regulator 118 will remain enabled and the microcomputer 130 remain powered. The microcomputer 130 is configured to keep the keep-awake line 152 active (low) until it has completed its routine and is ready to shut down.

Event Device Circuitry and Internet Radio Circuitry

The event device circuitry 144 has a 4th voltage regulator 128 that is connected to a fourth power supply 150, which may be the same power supply as the first power supply 132. In the exemplary embodiment, the 4th voltage regulator 128 is a low dropout voltage regulator, with very low quiescent current in the off state, such as the Microchip MCP1804, but in other embodiments, may be some other voltage regulator. The 4th voltage regulator 128 output is connected to a first event device 160 in the event device circuitry 144 and possibly others, represented in FIG. 1 as an nth event device 162. These devices may have sensors to measure quantities such as temperature, pressure, water level, etc. Some of these devices may have one or more of the sensors (114, 116) in the sleep-mode circuitry 140. An awake-mode device enable line 166 is connected to an output of the microcomputer 130 and to an enable pin of the 4th voltage regulator 128. When the microcomputer 130 holds the awake-mode device enable line 166 active (high), the 4th voltage regulator 128 switches on and shunts electrical power from the fourth power supply 150 to the devices (160, 162) in the event device circuitry 144. When the microcomputer 130 holds the awake-mode device enable line 166 inactive (low), the 4th voltage regulator 128 switches off and electrical power is cut off from the devices (160, 162) in the event device circuitry 144. The 4th voltage regulator 128 is able to pass far more current and power than the first voltage regulator 112, allowing the devices (160, 162) in the event device circuitry 144 to be more power hungry than the sensors (114, 116) in the sleep-mode circuitry 140.

The internet radio circuitry 142 has an internet radio 124 for communicating with other remote devices or with a central server. An internet radio enable line 164 is connected to an output pin on the microcomputer 130 and to an input of a FET 120 (field effect transistor). The FET 120 is also connected to a third power supply 148 and connected to a third voltage regulator 122. The third power supply 148 may be the same power supply as the first power supply 132. When the microcomputer 130 holds the internet radio enable line 164 active (high), the FET 120 switches on and shunts electrical power from the third power supply 148 to the third voltage regulator 122. When the microcomputer 130 holds the internet radio enable line 164 inactive (low), the FET 120 switches off and electrical power is cut off from the third voltage regulator 122. The third voltage regulator 122, when energized, is configured for providing power to the internet radio 124. The internet radio 124 is not included in the event device circuitry 144 because it is a particularly power hungry device. The FET 120 is capable of passing more current than is the 4th voltage regulator 128. Also, keeping the internet radio 124 out of the event device circuitry 144 allows the internet radio 124 to be shut down when it is not needed rather than powered up waiting for the other devices (160, 162) in the event device circuitry 144 to complete their tasks.

Microcomputer Awake-Mode Operation

Figure 2:
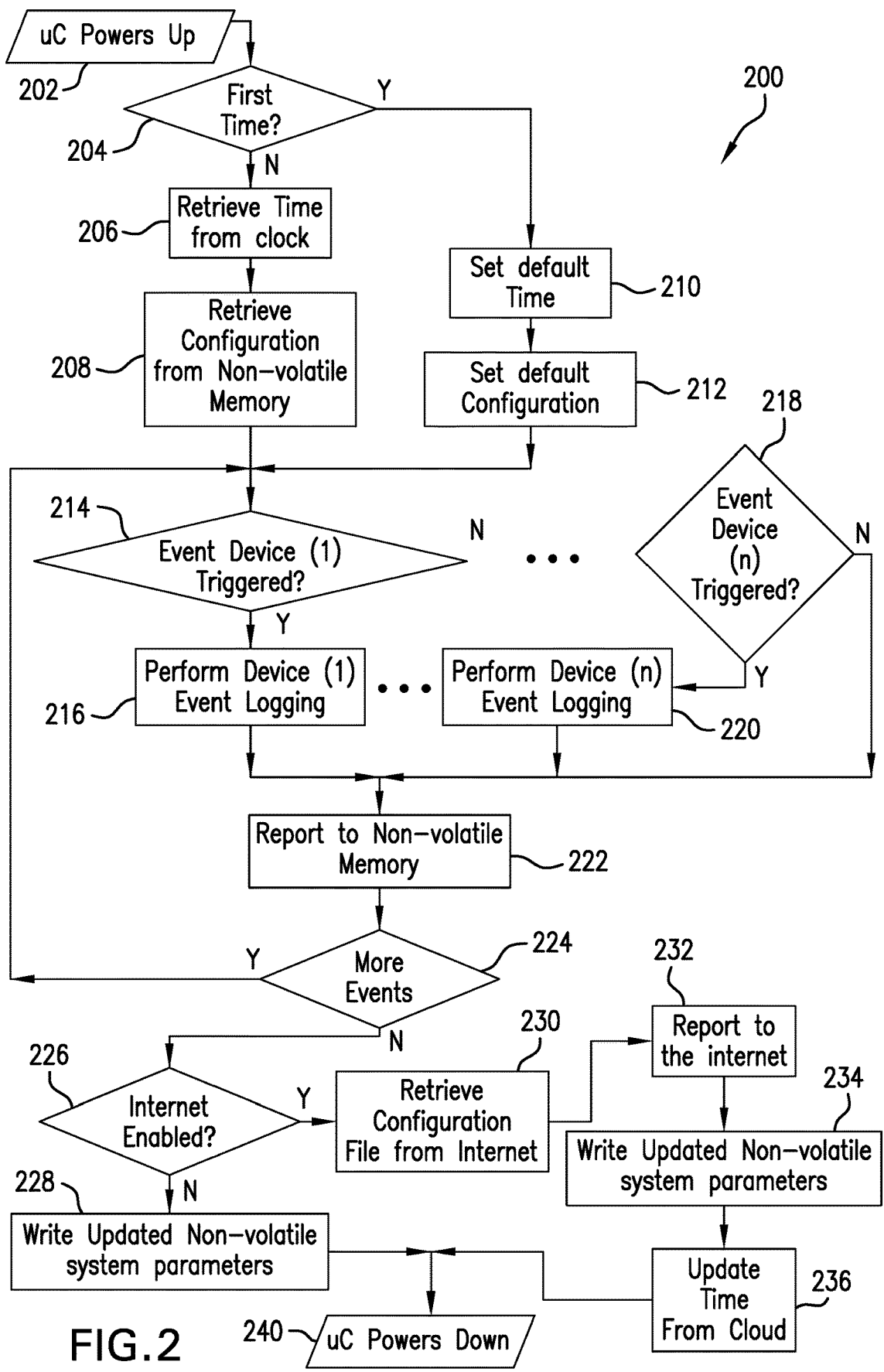
FIG. 2 shows a flow chart of an awake-mode method for the microcomputer sleep-mode system.

FIG. 2 shows a flow chart of an awake-mode method 200 for the microcomputer 130 of the microcomputer sleep-mode system 100. The awake-mode method 200 starts with step 202 in which the microcomputer 130 powers up, triggered by the RT clock 106 or one of the sensors (114, 116) in the sleep-mode circuitry 140.

In step 204, the microcomputer 130 determines whether the microcomputer 130 is starting up for the first time. If yes, then the microcomputer 130 sets time to a default time (step 210) and sets a default configuration (step 212). If no, then the microcomputer 130 retrieves time from the RT clock 106 (step 206) and retrieves configuration information from the NV RAM 102 (step 208).

After the microcomputer 130 sets its time and configuration, it checks event devices in sequence. After the microcomputer 130 powers up the event device circuitry 144, it checks the first event device 160 to determine if it has been triggered (step 214). If it has, then the microcomputer 130 performs logging of data from the first event device 160 (step 216). If not, then the microcomputer 130 proceeds to check the other event devices in sequence, logging their data if triggered, up to the nth event device 162 (steps 218 and 220).

After the microcomputer 130 has checked all the event devices (e.g. 160, 162) and logged any data, it stores a report of the logged data to the NV RAM 102. The microcomputer 130 then checks if more events have occurred (step 224) and if so, then looping back to step 214 to check the event devices (e.g. 160, 162) again. The event devices report the occurrence of an event that requires additional data logging by sending an interrupt signal to an interrupt pin on the microcomputer 130.

If the microcomputer 130 determines there are no more events (step 224), it then turns on the internet radio circuitry 142 and checks if the internet radio circuitry 142 has made a connection to the internet (step 226). If so, then the microcomputer 130 retrieves an updated configuration file from a server over the internet connection (step 230) if one is available, reports the logged data to a central server over the internet connection (step 232), writes to the NV RAM 102 any updated non-volatile parameters that it wishes to save when it returns to sleep-mode (step 234), then updates the time for the microcomputer 130 and RT clock 106 from a source on the internet (step 236) and then powers down (step 240). If the microcomputer 130 determines the internet radio circuitry 142 has not established a connection to the internet (step 226), it writes to the NV RAM 102 any updated non-volatile parameters that it wishes to save when it returns to sleep-mode (step 228), and then powers down (step 240).

What is claimed is:

1. A microcomputer sleep mode system comprising:
    a microcomputer;
    a sleep-mode circuitry having a clock and one or more sensors, the sleep-mode circuitry configured for providing power to the microcomputer, turning the power on based output states of the clock and the one or more sensors;
    a NAND gate with inputs connected to an output of the clock and a keep-awake line from the microcomputer;
    an OR gate with inputs connected to an output of the NAND gate, outputs of the one or more sensors;
    a first voltage regulator connected to a first power supply, the first voltage regulator configured for providing power to the clock, the one or more sensors, the NAND gate, and the OR gate; and
    a second voltage regulator connected to a second power supply and to an output of the OR gate, the second voltage regulator configured for turning power on and off to the microcomputer based on a state of the output of the OR gate.

* * * * *